United States Patent Office.

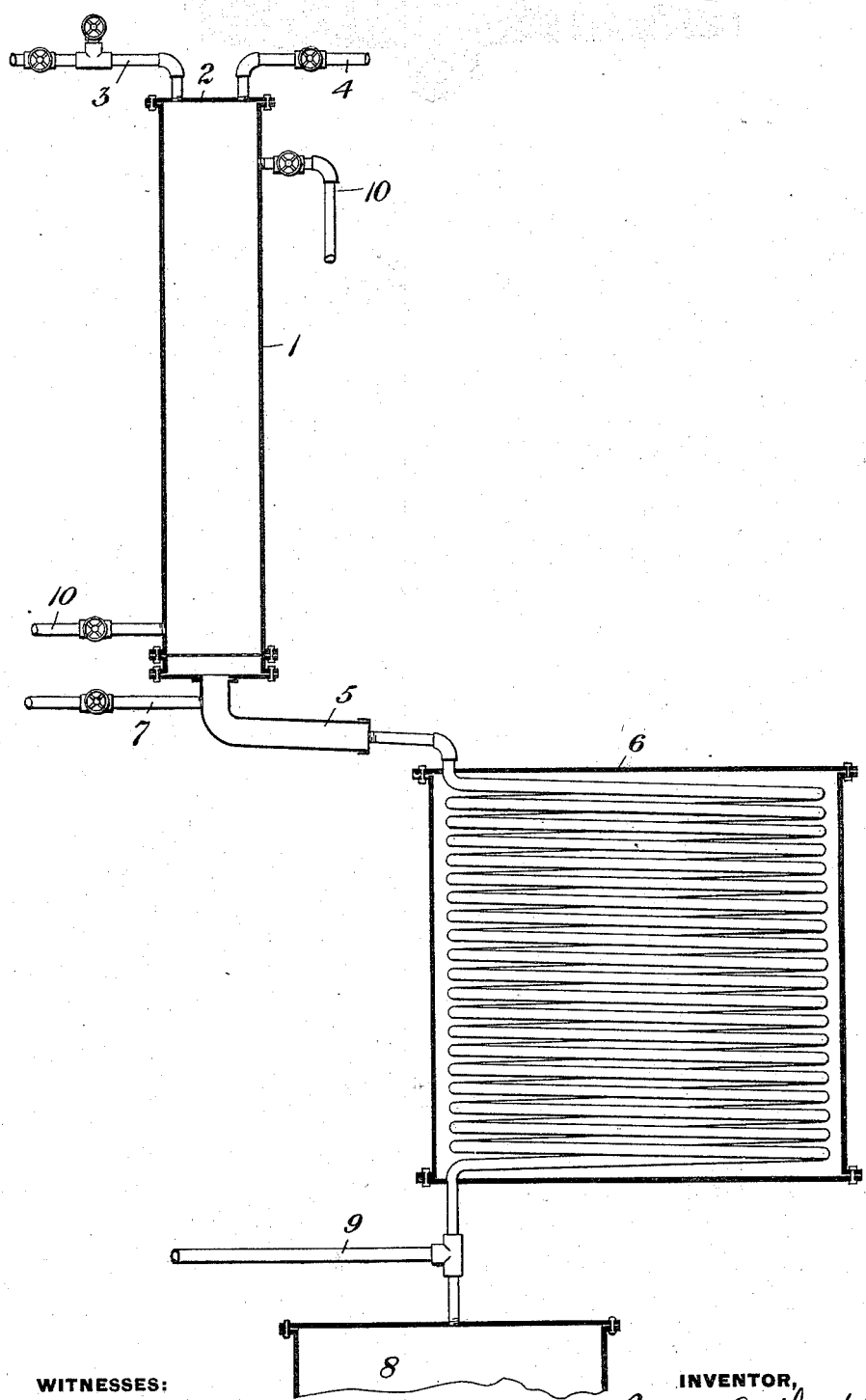

JESSE A. DUBBS, OF ALLEGHENY, PENNSYLVANIA, ASSIGNOR OF TWO-THIRDS TO CHARLES T. RUSSELL, OF SAME PLACE, AND JAMES H. WHITE, OF PITTSBURG, PENNSYLVANIA.

TREATMENT OF ANIMAL CHARCOAL.

SPECIFICATION forming part of Letters Patent No. 526,180, dated September 18, 1894.

Application filed June 17, 1893. Serial No. 477,938. (No specimens.)

*To all whom it may concern:*

Be it known that I, JESSE A. DUBBS, a citizen of the United States, residing at Allegheny, in the county of Allegheny and State of Pennsylvania, have invented or discovered certain new and useful Improvements in Treatment of Animal Charcoal, of which improvements the following is a specification.

The invention described herein relates to certain improvements in the treatment of animal charcoal with reference to the production of phosphate of lime and ammonia, and other valuable solid and gaseous by-products.

Heretofore, in the production of phosphate of lime from refuse animal charcoal, it has been customary to burn out the carbon in the open air. As the bone black is in a pulverous mass, it is customary to start the fire on top thereof, and as combustion is effected to rake off the top or burned out portion of the mass to permit access of the fire to the underlying portions. Animal charcoal has also been charged upon the hearth of a furnace, subjected to the action of flame and products of combustion and after being highly heated currents of air are caused to pass over the highly heated and burning animal charcoal so as to effect a complete combustion. In such a method the escaping gases do not contain any valuable elements, being composed for the most part of carbonic acid gas.

In the accompanying drawing, forming a part of this specification, is a sectional elevation of my apparatus adapted to the practice of my invention.

In the practice of my invention, the bone black or animal charcoal either freshly prepared or after it has been employed as a decolorizing agent in the manufacture of sugar, &c., is charged into the retort 1, one of whose heads or ends, as 2, is removed for that purpose. The head is then replaced and a highly heated fluid as steam, superheated to such an extent as will heat the bone black to a temperature, *i. e.*, about eleven hundred (1,100°) degrees Fahrenheit more or less as to ignite and burn on the admission of air or other oxidizing gaseous fluid, which is then introduced, through the pipe 3. As soon as the bone black has been raised to the proper temperature, the steam is shut off, and air or other oxidizing gaseous fluid, is introduced through the pipe 4. As the air comes in contact with the heated bone black, the carbon of the bone black ignites and is consumed. The flow of air through the retort is maintained until all the carbon is burned out, leaving the phosphate of lime, which is incombustible. In lieu of the superheated steam, highly heated air may be employed for the preliminary heating of the bone black, as well as the subsequent combustion of the carbon, but the use of the hot air may be discontinued and air at ordinary temperature substituted therefor, as soon as the bone black has been heated to the point of combustion, as above stated; or, if desired, steam either superheated or not, may be employed alone for the removal of the carbon.

It will be readily understood that by igniting or heating the charge to the point of ignition at one end and promoting the combustion by forcing in air or steam, or both, at the same end, the combustion will be slowly progressive through the length of the charge; and that as the gases produced by combustion pass on through the more or less heated charge, complete combustion will not be effected. Hence, the gases produced will consist of carbon mon-oxide, large volumes of cyanogen and other gases are generated.

In order to utilize the cyanogen, the gases generated in the retort are conducted by a pipe 5 to the condenser 6. As the gases flow through the pipe 5, steam perfectly wet, is mingled therewith, being introduced through the pipe 7. By the action of the hot gases on the steam, the latter is separated, its oxygen combining with the carbon of the gases forming carbon monoxide and dioxide, while the nitrogen combines with the hydrogen of the steam forming ammonia. The gases then flow through the condenser, where the ammonia, which combines with the excess of steam introduced at 7, is condensed, and the aqua ammonia flowing into the tank 8, and the uncondensable gases (such as carbon monoxide, &c.) are preferably collected for use as desired. At a suitable point above the tank 8, connection may be made as at 9, to a vacuum pump for the purpose of removing the uncondensed gases.

It will be readily understood by my improvements I am enabled to easily effect not only the removal of the carbon from the animal charcoal, but, also, a separation of nitrogen from the air, preparatory to its combination with hydrogen. During the latter part of the process, i. e., after nearly all the carbon has been removed, it sometimes happens that cyanides and cyanates are formed by the action of the air or steam or both on the phosphate in the retort. In order to remove these from the retort and also to extract nitrogen from such compounds, steam is admitted into the retort at one or more points by the pipes 10. The carbon of the cyanides or cyanates will combine with oxygen of the steam and the nitrogen with the hydrogen, thereby forming an additional quantity of ammonia and other gases.

I claim herein as my invention—

1. The herein described process, which consists in effecting the progressive and more or less complete elimination of carbon from animal charcoal, by passing an oxidizing gaseous fluid as, for example, air, or steam or a mixture of air and steam, through the animal charcoal heated to the point of ignition and so arranged within the retort as to prevent a complete combustion of the gases generated by the combustion of the carbon, &c., thereby permitting of the generation of cyanogen and other valuable gaseous by-products, substantially as set forth.

2. The herein described process, which consists in passing a highly heated gaseous fluid through animal charcoal, so arranged within a retort as to prevent complete combustion, and then effecting an elimination of the carbon, with the consequent production of cyanogen and other valuable gaseous by-products by passing air through the highly heated animal charcoal, and thereby effecting a more or less complete elimination or combustion of the carbon, substantially as set forth.

3. The herein described process, which consists in passing an oxidizing gaseous fluid, such as air or steam, or a mixture of air and steam, through highly heated animal charcoal, so as to effect a more or less complete elimination of the carbon injecting steam into the gases so formed, and then condensing the condensable gases or vapors, substantially as set forth.

4. The herein described process, which consists in passing a highly heated fluid through animal charcoal, to heat the same to the point of ignition, passing air through the highly heated charcoal, to effect a more or less complete elimination of the carbon, mingling steam with the gases so formed and then condensing the condensable gases or vapors, substantially as set forth.

In testimony whereof I have hereunto set my hand.

JESSE A. DUBBS.

Witnesses:
DARWIN S. WOLCOTT,
E. J. SMAIL.